United States Patent

Burgio

[11] 4,215,657
[45] Aug. 5, 1980

[54] COMBUSTION CHAMBER OF A DIESEL CYCLE INTERNAL COMBUSTION ENGINE

[75] Inventor: Antonio Burgio, Moncalieri, Italy

[73] Assignee: Fiat Auto S.p.A., Turin, Italy

[21] Appl. No.: 924,585

[22] Filed: Jul. 14, 1978

[30] Foreign Application Priority Data

Sep. 23, 1977 [IT] Italy ................. 69101 A77

[51] Int. Cl.² ............. F02B 3/00; F02F 1/00
[52] U.S. Cl. ............. 123/269; 123/193 CH; 123/193 CP; 123/282
[58] Field of Search ............ 123/32 ST, 32 SP, 32 B, 123/32 C, 32 D, 191 S, 191 SP, 193 P, 193 CP, 193 H, 193 CH

[56] References Cited

U.S. PATENT DOCUMENTS

| | | | |
|---|---|---|---|
| 3,814,067 | 6/1974 | De La Fuëte | 123/32 ST |
| 4,123,902 | 11/1978 | Iida | 123/193 H |
| 4,127,089 | 11/1978 | Tsutsumi | 123/191 S |
| 4,146,004 | 3/1979 | DuBois | 123/193 CH |

FOREIGN PATENT DOCUMENTS 584304  9/1959  Canada ................. 123/191 S

Primary Examiner—P. S. Lall
Attorney, Agent, or Firm—Sughrue, Rothwell, Mion, Zinn and Macpeak

[57] ABSTRACT

A diesel cycle internal combustion engine having at least one cylinder with coplanar induction and exhaust valves and a precombustion chamber, in which the cylinder head is formed with a recess defining a combustion chamber with a projection on the crown of the piston, both the recess and the projection having a triangular cross section with respective upper surfaces being inclined at different angles from one another with respect to the longitudinal axis of the cylinder and respective side surfaces being inclined at substantially the same angle as one another with respect to the longitudinal axis of the cylinder.

4 Claims, 1 Drawing Figure

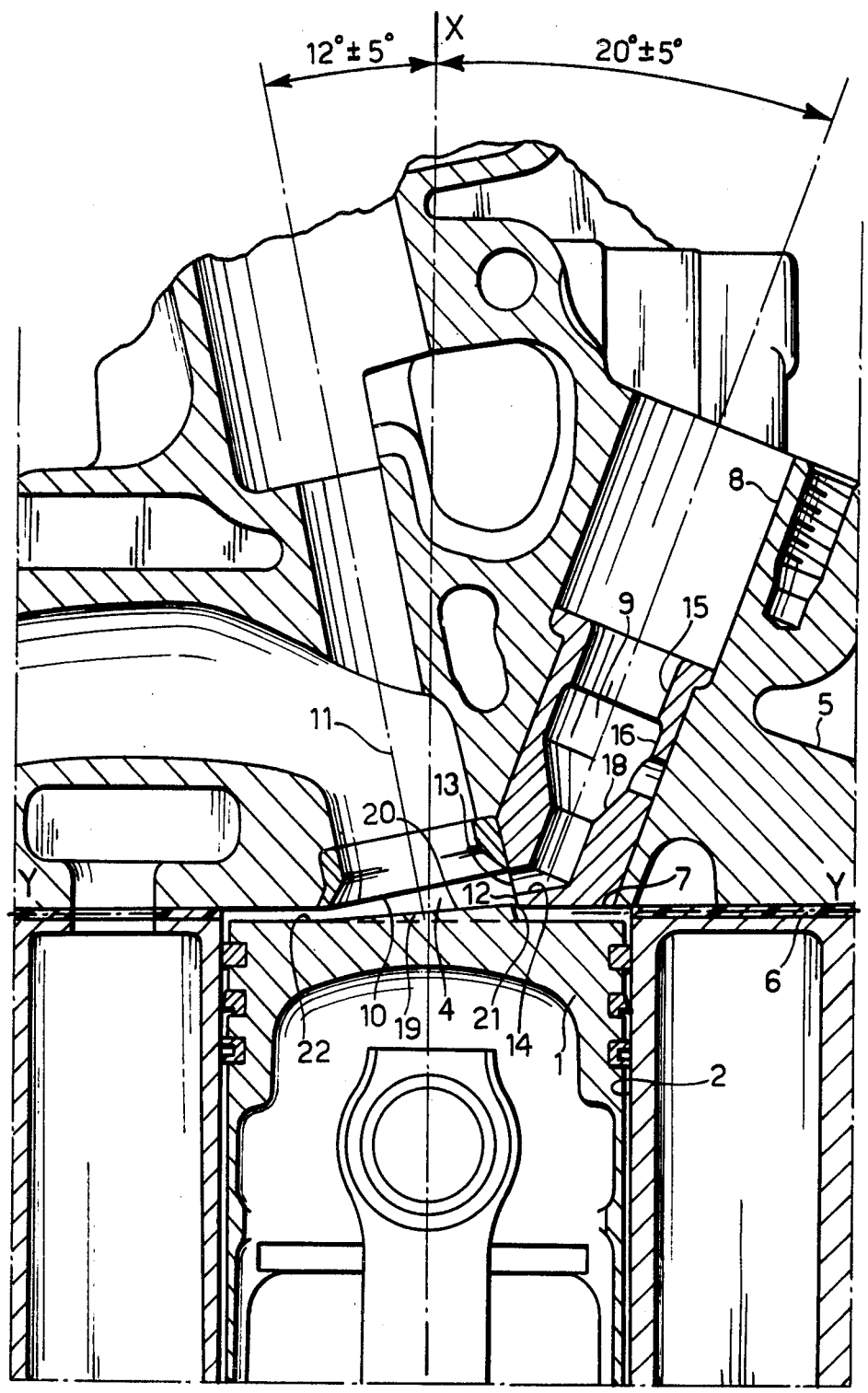

COMBUSTION CHAMBER OF A DIESEL CYCLE INTERNAL COMBUSTION ENGINE

The present invention relates to an improvement in the combustion chamber of a diesel cycle internal combustion engine with a precombustion chamber, and is suitable for use with any engine whether supercharged or not.

It is known to provide four stroke internal combustion engines of the spark-ignition type having valves in the cylinder head with combustion chambers of substantially triangular cross section. Such combustion chambers are delimited by walls, in one of which, which is substantially plane, are formed valve seats with parallel axes.

Because the plane wall of the chamber has to be orthogonal to the axes of the valves, then if these are inclined with respect to the longitudinal axis of the cylinder, the plane wall is itself inclined with respect to the said axis of the cylinder and the cross section of the combustion chamber has a form which in transverse section is substantially triangular.

This is particularly useful in as much as it permits the use of valves having parallel axes which can be controlled by a single camshaft positioned, for example, above the cylinder head of the engine. In addition it is simple to construct, and spark-ignition engines having such combustion chambers have a good indicated efficiency.

Moreover, it is known that for the purpose of increasing the performance of an engine, the maximum enlargement of the heads of the valves is necessary; this makes it necessary, in a diesel engine, to position the precombustion chamber laterally with respect to the combustion chamber, and the result of this is that before the power stroke the distance the flame front coming from the precombustion chamber has to travel in order to reach those regions of the combustion chamber furthest from the precombustion chamber is somewhat longer than for the other zones, and thus it takes a non-uniform time for homogenisation of the combustion and, consequently, a non-uniform time for propogation of the flame front.

The present invention seeks therefore to provide a compression-ignition engine with a combustion chamber which is so shaped that the above mentioned disadvantages are eliminated or at least substantially reduced, and a progressive regular and complete combustion of the fuel in the combustion chamber is obtained. Embodiments of the invention are particularly suitable to be used on injection engines with precombustion chambers. This is achieved, inter alia by ensuring that fuel injected into the combustion chamber is subjected to significant turbulence due to the shape of the combustion chamber for the purpose of allowing the development of a complete and progressive combustion.

According to the present invention there is provided a diesel cycle internal combustion engine having a precombustion chamber, in which the induction and exhaust valves are disposed in the cylinder head of the engine and have axes lying in a common plane inclined with respect to the axis of the cylinder or cylinders of the engine, in which or each of which cylinder there is a combustion chamber having a main part of substantially triangular cross section defined by a recess in the cylinder head, which recess has an upper surface and a side surface, the said upper surface being substantially orthogonal to the axes of the valves and having the seats of the valves formed therein, and by a projection of triangular section upstanding from the crown of the piston in the cylinder, which projection is defined by an upper surface facing the upper surface of the said recess in the cylinder head and lying at an angle with respect thereto and a side surface, the main part of the combustion chamber having a lateral extension delimited by the bottom surface of the cylinder head of the engine and by a plane part of the crown of the piston orthogonal to the axis of the cylinder and situated on the side of the said recess remote from the precombustion chamber, the said side surface of the upstanding projection on the crown of the piston being so positioned that when the piston is in the top dead centre position this side surface lies closely adjacent the side surface of the triangular section recess in the cylinder head whereby substantially to close the main part of the combustion chamber adjacent the said precombustion chamber.

When used in this specification, the term "main part" of a combustion chamber will be understood to refer to that part of a combustion chamber in the cylinder of an internal combustion engine which remains when the piston is in the top dead centre position.

One embodiment of the invention will now be more particularly described, by way of example, with reference to the accompanying drawing which is a vertical section of a part of a diesel cycle internal combustion engine having a precombustion chamber and indirect injection.

In the embodiment illustrated in the drawing, there is shown a piston 1 which is reciprocable along a cylinder 2 formed in a cylinder block 3. It will be appreciated that, as is usual with such engines, there would be provided a plurality of cylinders like the cylinder 2, say four or six or more, which are aligned with one another, along a crankshaft (not shown) of the engine and positioned with their axes (such as the axis x—x of the drawing) all lying in a common plane.

Superimposed on the cylinder block 3 is a cylinder head 5 of the engine, the lower plane surface of which is indicated 7; in this lower plane surface 7, which faces the cylinder 2, there is formed a triangular section recess 4. In the cylinder head 5 of the engine there is also formed a bore 8 which receives and supports an injector (not shown) and an insert in which is formed a precombustion chamber 9, which is sited laterally of the axis X—X of the cylinder 2 and has an inclination, with respect to the axis X—X of between 0° and 60°; and preferably in the region of 20°±5°.

A gasket 6 positioned between the upper face of the cylinder block 3 and the lower plane surface 7 of the cylinder head 5 provides for the sealing of gases produced, during the firing stroke of the piston, in the interior of the cylinder 2. The recess 4, which is intended to constitute the main portion of the combustion chamber of the engine when the piston 2 is in the top dead centre position, is open downwardly towards the cylinder 2. This recess 4 has a triangular profile in cross section, delimited above by a plane surface 10 which is orthogonal to the axes of the induction and discharge valves of the engine, the axes of which valves are parallel to one another, and only one of which can be seen in the drawing, this being indicated with the reference numeral 11. The plane surface 10 extends transversely across only a part of the diameter of the cylinder, although as an alternative embodiment (not shown) it can extend across the whole width of the cylinder.

The plane containing the axis 11 of the valve, and indeed the axes of all the valves of the cylinders, is orthogonal to the plane of the drawing and inclined with respect to the axis X—X of the cylinder (which itself is orthogonal to the surface 7 of the cylinder block) by an angle of between 5° and 30°; preferably this inclination is about 12°±5°. The plane surface 10 is thus inclined at the same angle with respect to the surface 7 of the cylinder block. At the side the combustion chamber 4 is delimited by a plane wall 12 which because of the triangular conformation of the combustion chamber, defines its greatest height.

In the plane wall 12 there is formed an opening 13 communicating through a duct 14 with the precombustion chamber 9 in the insert housed in the bore 8. The said precombustion chamber comprises a first cylindrical section 15, which serves to locate the end of an injector, a first cylindrical portion 16, a second cylindrical portion 17 and an intermediate frusto-conical section 18. The second cylindrical portion 17 of the precombustion chamber communicates with the combustion chamber 4 through the duct 14 and the opening 13.

The piston 1 carries on its crown, and in a position corresponding to that of the recess 4 in the cylinder head, a projection 19 which also has a substantially triangular profile. The top of this projection is defined by an inclined plane 20 the inclination of which differs from that of the surface 10. The side of the projection 19 is defined by a surface 21 and the projection as a whole is positioned and dimensioned in such a way as to penetrate into the recess 4 when the piston 1 reaches the top dead centre position; in this position the lateral surface 12 of the recess and the lateral surface 21 of the projection fit closely together and are almost touching.

The volume of the combustion chamber thus has a main part delimited by the side wall 12 of the recess 4, the plane top wall 10 of the recess 4, and the inclined plane surface 20 of the projection 19 of the piston, which latter surface extends into a plane section 22 of the piston crown which, together with the facing part 40 of the bottom surface 7 of the cylinder head defines the portion of the main part of the combustion chamber which is furthest from the precombustion chamber 9.

The plane surface 10 of the recess 4, and the inclined plane surface 20 of the projection 19 on the piston crown are not parallel to one another but form an angle, divergent towards the plane wall 12, of between 2° and 10°.

A very important advantage obtained with an engine having a combustion chamber with these characteristics is that the cross section of the combustion chamber decreases with distance from the precombustion chamber. In this way there is obtained an increase in the velocity gradient of of the flame front ejected from the precombustion chamber, which induces a greater turbulence in the extreme peripheral zones of the cylinder, thereby ensuring more complete combustion of the fuel in that part of the combustion chamber defined by the part 22 of the crown of the piston, by the facing part of the lower face of the cylinder head, and by the thickness of the gasket which seals the combustion gases.

What is claimed is:

1. In a diesel cycle internal combustion engine having at least one cylinder and a cylinder head with a precombustion chamber and in which the induction and exhaust valves are disposed in said cylinder head of the engine and have axes lying in a common plane, the improvement comprising:

a combustion chamber in said cylinder having a main part in a recess of substantially triangular cross section located in said cylinder head, said recess having an upper surface and a side surface, said upper surface being substantially orthogonal to the axes of said induction and exhaust valves with the seats of said induction and exhaust valves being formed in said upper surface, a duct having an opening in said side surface communicating said precombustion chamber with said main part of said combustion chamber, a projection of triangular section standing up from the crown of the piston in said at least one cylinder, said projection being defined by:

an upper surface facing said upper surface of said recess in said cylinder head and lying at an angle with respect thereto and converging toward each other in a direction away from said duct opening in said side surface of said recess, and a side surface, a lateral extension of said main part of said combustion chamber being delimited by:

the bottom surface of said cylinder head of the engine, and a plane part of said crown of said piston, said plane part extending orthogonal to the axis of said at least one cylinder and being situated on the side of said recess in said cylinder head remote from said precombustion chamber, said side surface of said projection standing up on said crown of said piston being positioned whereby when said piston is in the top dead centre position this side surface lies closely adjacent said side surface of said recess in said cylinder head whereby substantially to close said main part of said combustion chamber adjacent said precombustion chamber.

2. A diesel cycle internal combustion engine as in claim 1, wherein said upper surface of said recess is inclined by approximately 12°±5° with respect to said bottom surface of said cylinder head of said engine.

3. A diesel cycle internal combustion engine as in claim 1 or claim 2, wherein the angle between the plane orthogonal to the axes of said valves and said upper surface of said projection standing up on said crown of said piston, lies between 2° and 10°.

4. A diesel cycle internal combustion engine as in claim 1, wherein said precombustion chamber is formed in an insert housed in a seat in said cylinder head and the longitudinal axis of said seat which receives and supports said insert in which said precombustion chamber is formed is inclined by 20°±5° with respect to the longitudinal axis of said at least one cylinder of the engine.

* * * * *